(12) United States Patent
Kahn et al.

(10) Patent No.: US 12,549,554 B2
(45) Date of Patent: Feb. 10, 2026

(54) DATA COLLECTION COORDINATION AND PERSISTENT STORAGE CONTROL FOR ANALYTICS

(71) Applicant: NOKIA TECHNOLOGIES OY, Espoo (FI)

(72) Inventors: Colin Kahn, Morris Plains, NJ (US); Thomas Theimer, Baierbrunn (DE); Péter Szilágyi, Budapest (HU); Cinzia Sartori, Pullach (DE)

(73) Assignee: Nokia Technologies Oy, Espoo (FI)

( * ) Notice: Subject to any disclaimer, the term of this patent is extended or adjusted under 35 U.S.C. 154(b) by 652 days.

(21) Appl. No.: 17/912,252

(22) PCT Filed: Jan. 28, 2021

(86) PCT No.: PCT/EP2021/051967
§ 371 (c)(1),
(2) Date: Sep. 16, 2022

(87) PCT Pub. No.: WO2021/190806
PCT Pub. Date: Sep. 30, 2021

(65) Prior Publication Data
US 2023/0147094 A1 May 11, 2023

Related U.S. Application Data

(60) Provisional application No. 62/993,444, filed on Mar. 23, 2020.

(51) Int. Cl.
*H04L 9/40* (2022.01)
*H04L 67/63* (2022.01)

(52) U.S. Cl.
CPC ............ *H04L 63/102* (2013.01); *H04L 67/63* (2022.05)

(58) Field of Classification Search
CPC ... H04L 41/0686; H04L 41/145; H04L 41/16; H04L 41/5054; H04L 41/5093; H04L 63/102; H04L 67/63
See application file for complete search history.

(56) References Cited

U.S. PATENT DOCUMENTS

2018/0262924 A1* 9/2018 Dao .................... H04W 72/535
2019/0356558 A1* 11/2019 Han ........................ H04L 41/14
(Continued)

FOREIGN PATENT DOCUMENTS

| KR | 2019 0132898 A | 11/2019 |
| WO | 2019/197467 A1 | 10/2019 |
| WO | 2020/025715 A1 | 2/2020 |

OTHER PUBLICATIONS

International Search Report and Written Opinion dated Apr. 22, 2021 corresponding to International Patent Application No. PCT/EP2021/051967.
(Continued)

*Primary Examiner* — Theodore C Parsons
(74) *Attorney, Agent, or Firm* — Nokia Technologies Oy

(57) ABSTRACT

Systems, methods, apparatuses, and computer program products for data collection coordination and persistent storage control for analytics. For example, certain embodiments may provide a unified data management framework that efficiently serves data collection and distribution needs and isolates a consumer from a producer. Further, some embodiments may provide for a reduction or elimination of unnecessary data storage in a data repository used in association with the data management framework provided by certain embodiments. Specifically, certain embodiments may allow a consumer entity that is requesting specific data to specify whether the data is to be kept in persistent storage in a data repository. The consumer entity, when requesting data, may send an indication that data is to be provided to the
(Continued)

consumer entity only, that data is to be provided to the data repository only, or that the data is to be provided to the data repository and the consumer entity.

21 Claims, 9 Drawing Sheets

(56) References Cited

U.S. PATENT DOCUMENTS

| | | | |
|---|---|---|---|
| 2021/0297874 A1* | 9/2021 | Marquezan | ....... G06F 16/90335 |
| 2022/0272010 A1* | 8/2022 | Marquezan | ............. H04L 41/40 |

OTHER PUBLICATIONS

3GPP TS 23.288 V16.2.0 (Dec. 2019), Technical Specification, 3rd Generation Partnership Project; Technical Specification Group Services and System Aspects; Architecture enhancements for 5G System (5GS) to support network data analytics services (Release 16), Dec. 2019.

3GPP TR 23.700-91 V0.3.0 (Jan. 2020), Technical Report, 3rd Generation Partnership Project; Technical Specification Group Services and System Aspects; Study on enablers for network automation for the 5G System (5GS); Phase 2 (Release 17), Jan. 2020.

* cited by examiner

DATA COLLECTION COORDINATION AND PERSISTENT STORAGE CONTROL FOR ANALYTICS

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for data collection coordination and persistent storage control for analytics.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

BRIEF DESCRIPTION OF THE DRAWINGS

For proper understanding of example embodiments, reference should be made to the accompanying drawings, wherein.

DETAILED DESCRIPTION

Figure 1:
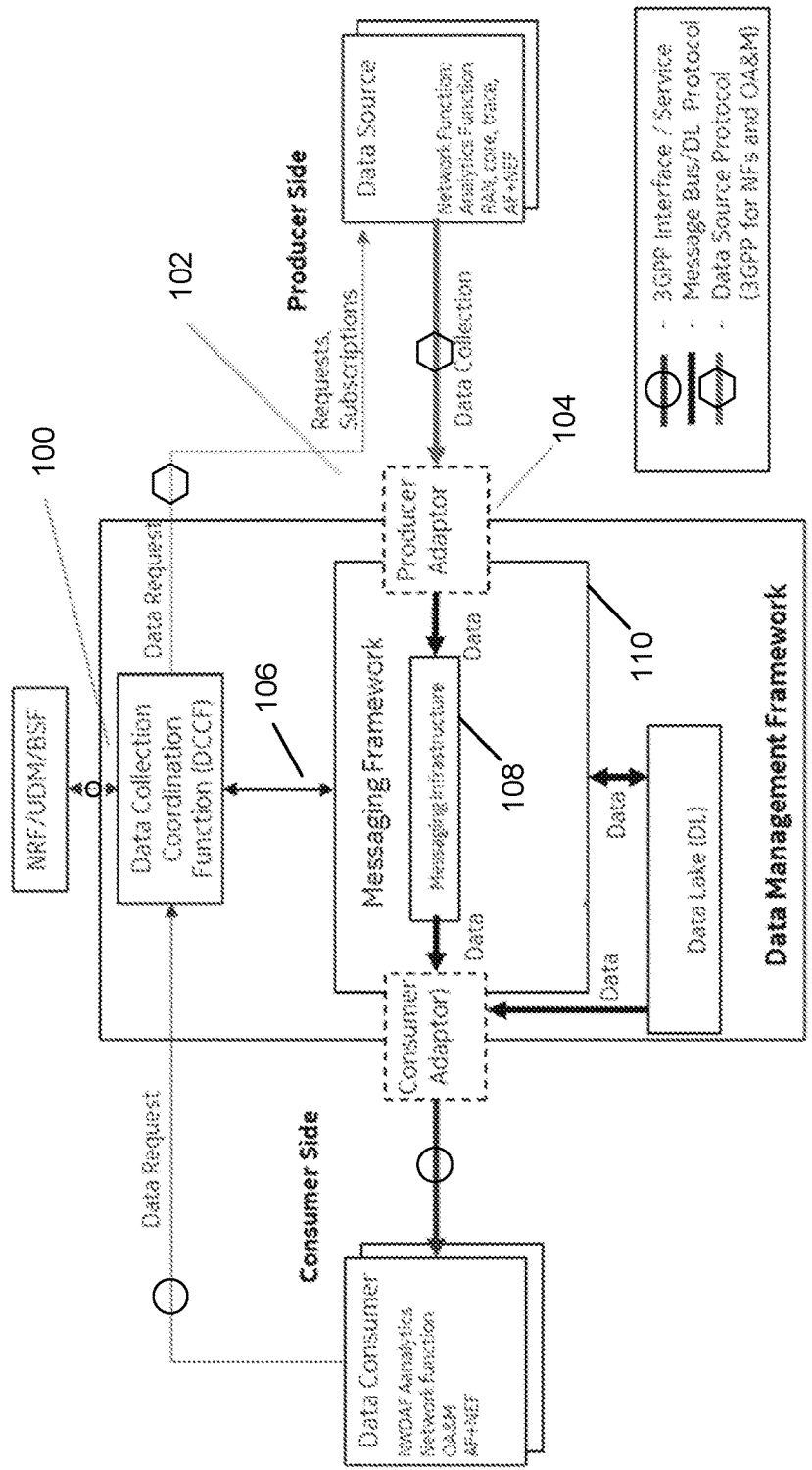
FIG. 1 illustrates an example of a data management framework that includes a DCCF, according to some embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for data collection coordination and persistent storage control for analytics is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

NR is considering enablers for network automation for the 5G system. Several issues touch on data/information collection and distribution to support the network data analytics function (NWDAF), though for different types of data/information. One issue relates to logical decomposition of the NWDAF and possible interactions between logical functions. This relates to how the NWDAF could be split to support functions including data collection from network functions (NFs), application functions (AFs), and operations, administration and maintenance (OA&M), and how to support analytics information provisioning to NFs and AFs. Another issue relates to multiple NWDAF instances. This relates to architectural and functional changes to support multiple NWDAF instances, including hierarchies, roles, and inter-NWDAF instance cooperation. It also relates to whether data collection and/or analytics generation can be enhanced in the case of multiple NWDAFs, for example, whether NWDAFs can cooperate with each other, and how to achieve a specific data collection and/or analytics generation target.

Another issue relates to data collection efficiency. This relates to how to reduce signaling load for data collection, achieve communication efficiencies in large networks consisting of many NF instances and NWDAF instances, reduce dependency on managing subscriptions because of lifecycle events on a NF and/or a NWDAF, reduce dependency on managing subscriptions because of change in serving entities for a UE, and/or reduce complexity at the NWDAF in determining entities serving a UE or a group of UEs and entities serving an area at a particular time window. In addition, this issue relates to which architectural enhancements should be defined to minimize load for data collection, for example, for a single NWDAF as well as in a multiple NWDAF environment, which enhanced mechanisms can be defined for the NWDAF and NFs to minimize the load for data collection, how to prevent NWDAF(s) triggering the data collection of the same data from the same NF(s)/AF(s)/originating address(es) (OA(s)), and how to reduce frequency of notifications that are transmitted by the source NF.

Another issue relates to trained data model sharing between multiple NWDAF instances. This issue relates to how a NWDAF instance provides the trained data model to other NWDAF instances, how an NWDAF instance discovers and consumes the data model trained by other NWDAF instances, and/or which interactions should have standardized interfaces with NWDAF architecture.

These issues may provide an opportunity to propose a common, efficient architecture for collection and distribution of data/information. For example, the data/information may include data that are to be retrieved from various sources (e.g. NFs, such as AMF, session management functions (SMFs), policy control functions (PCFs), and/or AFs), as a basis for computing NWDAF analytics, analytics that are to be produced by NWDAFs for use by other NWDAFs and NFs acting as consumer entities, and/or trained data model information is to be shared among NWDAFs.

In NR, the data collection/sharing model for a NR NWDAF relies on peer-to-peer 3GPP services. A NWDAF consumer uses services of a producer (e.g., a 5G core network (5GC) network function or OA&M function) to obtain data for computation of analytics. If, for example, two NWDAFs need the same data from a producer, there is no coordination. Each consumer separately requests the data from the producer, for each consumer the producer separately measures or otherwise obtains the data, and the producer separately responds to the consumers with the required data. The data may be event-driven notifications or data files that are sent repeatedly to the consumer, or the data may be streamed from the producer. If the data are to be archived in a data repository (e.g., a data lake) for persistent storage, yet another consumer/producer interaction may be required, where the consumer is the data repository. Another aspect of the peer-to-peer approach is that the consumer tracks subscriptions during producer life-cycle events or because of a change in serving entities. There is no decoupling between the consumer and producer.

The inefficiencies noted above also apply to other data data/information collection and distribution tasks. In NR, the same peer-to-peer relationship occurs when there is more than one consumer of NWDAF analytics, as may be the case with broadly applicable analytics, such as UE mobility predictions. In NR, consumers wanting the same analytics information have to separately use an NWDAF's services without coordination.

One mechanism for dealing with data distribution to multiple sources is to use a publish/subscribe mechanism with a message broker. A producer may publish data to a broker platform while consumers independently subscribe to the same platform to receive the data. Producers and consumers may act independently, publishing and subscribing to available streams. Using these platforms, producers may publish streams organized by topics, while consumers may subscribe to one or more of the topics. This can be very efficient for storing and distributing large volumes of data, and may be used to construct reliable real-time streaming pipelines and to build real-time streaming applications that transform or react to the data streams. Message queuing telemetry transport (MQTT) is another example. MQTT is a protocol that allows clients to publish messages to a broker that then distributes them to subscribed clients.

Another prior solution proposes a publish/subscribe mechanism using a messaging framework and adaptors between 5GC NFs and a messaging framework. It decouples producers and consumers for data collection, thereby offloading, from the consumer, management of subscriptions changes due to life-cycle events or a change in the entity serving a UE.

One issue with applying this model without modification to 3GPP network analytics 5GC functions is that it does not achieve the efficiency requirements described in above. Decoupling the consumer from the producer using the publish/subscribe mechanism means producers may collect and stream/send data that is not needed by any consumer, wasting producer resources. Efficiency is important for NFs (e.g., AMFs or SMFs) that are engaged in real-time control activities to register, authenticate, manage mobility, and manage sessions for UEs. This is particularly relevant for UE-specific data, where there may be massive numbers of UEs but data are used for a small subset of them. UE location, trace, mobile drive test (MDT), and communication data are examples of this type of data.

In addition, this coupling means it is not consistent with the 5G Core (5GC) architecture where consumers request data from producers (e.g., using subscribe/notify mechanisms). Again, in the subscribe/notify pattern, data is produced when required by a consumer (i.e., at least one subscription exists).

One possible solution proposes use of a DCCF. However, this solution only addresses coordinating data collection for multiple NWDAFs, or NWDAF sets. It does not cover the wider data collection coordination problem involving data collection from any data source for any consumer. In addition, in that solution, the NWDAF is still responsible for discovering the NF that will provide the data. Also, in that solution, the NWDAF is not relieved of life-cycle management issues described above. Further, in that solution there is no independent message framework. As such, there is no separation between a control-plane managing requests for data, and a messaging framework where data from data sources are replicated and distributed to consumers. This affects scalability (e.g., in certain embodiments described herein there can N:M instances of DCCF to messaging frameworks), and it prevents the use of common third party messaging frameworks.

Some embodiments described herein may provide for data collection coordination and persistent storage control for analytics. For example, certain embodiments may address at least the problems described above by providing a data management framework for NWDAF-related data collection and sharing, where data may include the output from a data source that may be needed by one or more consumers. Certain embodiments may provide a unified data management framework that efficiently serves these data collection and distribution uses and isolates the consumer from the producer. In this way, certain embodiments may have the potential to provide consistency in the overall data distribution and sharing architecture, and may support compatibility with a range of consumer and producer/source types.

Data repositories are becoming fairly common for persistent storage of raw data that may be used for later processing by, for example, artificial intelligence (AI) and/or machine learning (ML) analytics platforms like the NWDAF that require training. Data repositories may use a distributed file system to store raw data, such as that generated in a 5G network, on commodity servers. In general, data repositories may be tasked with storing and providing access to data in its native and/or raw format. Control of what gets stored in a data repository may be decided by a policy configured by the data repository owner or operator.

The data management framework of certain embodiments may use the consumer/producer model of the 5G services-based architecture to efficiently exchange data or information of different types. The data framework may include at least the following: a data collection coordination function (DCCF), a messaging framework (data forwarding and replication), with adaptors to isolate the messaging framework protocol from the data source and the consumer, and/or a data repository.

Data requests from data consumers may be sent to the DCCF, which manages data collection from sources and subscriptions to a messaging framework that duplicates data and forwards it to subscribed data consumers. Data sources may produce data and send it to the messaging framework once, and because data is requested from data sources based on requests from data consumers, data sources may not produce and send data that is not needed by any consumer. A data repository may be included within the data management framework, where information obtained from data sources may be stored for future use, for example, by analytics artificial intelligence (AI) and/or machine learning (ML) algorithms. Data repositories may be useful when there is some governance, so they do not become an ever-expanding dumping ground for data that is un-needed or unwanted by any data consumers.

Some embodiments described herein further provide for a reduction or elimination of unnecessary data storage in a data repository used in association with the data management framework provided by certain embodiments. Specifically, certain embodiments may address at least problems of data repository pollution by un-needed data by providing a mechanism to control what data is stored in the data repository based on interest expressed by consumer entities. For example, certain embodiments may allow a consumer entity that is requesting specific data to dynamically specify whether the data is to be kept in persistent storage in a data repository. The consumer entity, when requesting data, may send an indication that data is to be provided to the consumer entity only, that data is to be provided to the data repository only, or that the data is to be provided to the data repository and the consumer entity.

In this way, certain embodiments described herein may help to ensure that data is only produced when needed by at least one consumer entity. Particularly, when the consumer entity is an AI/ML analytics function, such as an NWDAF, the consumer entity may have insight into whether the requested data is useful in the future (e.g., for ML training purposes). This conserves storage resources of the data repository that would otherwise be consumed storing un-needed data and/or conserves computing resources used to store the un-needed data in the data repository.

While certain embodiments described herein may allow a consumer entity to control persistent storage of data, it is also possible that other network functions, such as the DCCF may be involved in determining data repository storage. For example, the DCCF may determine, based on a query to the NRF and/or a unified data management (UDM) function, that all or some data (e.g., data for specific UEs, or for a subset of data generated by the network function) obtained from certain network functions (e.g., AMFs), all or some data from network functions in a certain geographic area, or all or some data from network functions that meet some other criteria should be stored in the data repository.

FIG. 1 illustrates an example of a data management framework that includes a DCCF, according to some embodiments. FIG. 1 illustrates a data consumer (e.g., a consumer entity), a data management framework (e.g., that includes a DCCF, a messaging framework that includes a messaging infrastructure, a consumer adaptor, a producer adaptor, and a data lake (as an example of a data repository)), and a data source.

The DCCF may include a control-plane function that determines the data source that can provide data requested by a consumer entity (e.g., if the data source is not already specified by the consumer entity when it sends a request to the DCCF). The DCCF may query other functions (e.g., a network resource function (NRF), a binding support function (BSF), and/or UDM) to determine the data source. In addition, the DCCF may coordinate data collection from data sources with requests from consumer entities. Based on this, data sources may receive one request for the same data, regardless of how many data consumers request that data. In addition, data sources may produce and send data once. Further, if there are no longer any data consumers that need data from a data source, the DCCF may instruct the data source to cease production and publication of the data to the messaging framework. The DCCF may subscribe to the messaging framework as a proxy for the data consumers so the messaging framework knows how to replicate and/or deliver data to the data consumers.

Introduction of the data management framework illustrated in FIG. 1 may use new messages and procedures as illustrated in the figures and described elsewhere herein. This may include messages to support DCCF interaction with the messaging framework, data consumer, data source and/or a network function, such as a NRF/UFM/BSF. Some example operations of the data management framework include, at 100, the DCCF finding the right data source, identifying the serving NF per UE, controlling data replication, and/or consolidating subscriptions, as described elsewhere herein. The producer adaptor, may, as illustrated at 102, be a stand-alone entity. The producer adaptor may alternatively by combined with the data source or may be incorporated in the messaging framework. The producer adaptor might not be implemented if the data source supports the message bus protocol used by certain embodiments. As illustrated at 104, the producer adaptor may isolate a message bus protocol from the data source and the data consumer.

As illustrated at 106, the DCCF and the messaging framework may communicate to coordinate request and/or data delivery. The messaging infrastructure illustrated at 108 may perform data forwarding and replication. The messaging framework illustrated at 110 may perform subscription/notification operations, publication operations, and/or data streaming operations.

As described elsewhere herein, certain embodiments may use a DCCF to efficiently manage data collection and distribution for analytics and other purposes. A single DCCF may interact with multiple data sources, data consumers, message frameworks and data lakes. However, to prevent duplicate data collection, each data source, and data lake acting as a source of persistent data may be associated with one DCCF.

The DCCF may receive data requests from data consumers. A consumer may include a NWDAF, and the request may include a request for NWDAF data collection. If the data source is not specified in the request from the data consumer, the DCCF may determine the data source that can provide the data. For example, if the request is for UE-specific data, the DCCF may query the NRF/UDM/BSF to determine which NF instance is serving the UE. The DCCF may examine a database built from prior requests to determine if the requested data is currently being produced by the data source and sent to the messaging framework. If the requested data is not being produced, a new subscription/request may be sent toward the data source to trigger a new data collection. Similarly, when the last data consumer indicates it no longer wants data, the DCCF may cancel data collection from the data source. This may help to ensure that the data source is only producing the same data once when there are multiple data consumers and is not producing data that un-needed by consumers.

The DCCF may manage subscription requests/cancellations to the messaging framework on behalf of the data consumer. There can be multiple DCCFs (e.g., for the 5GC, OA&M, and RAN). There can be separate instances of the DCCF for geographic regions or for different data source types (e.g., AMF or SMF data source types). A DCCF used by a consumer entity can be discovered using the NRF. The DCCFs may be interconnected to exchange information about available data sources. In addition, in some embodiments, the interface between the DCCF and the messaging framework may be specified by 3GPP. In that case, an adaptor associated with the framework may translate between the 3GPP protocol and the messaging framework protocol.

The messaging framework may include a messaging infrastructure that propagates event information and data (e.g., streaming and notifications) from data sources to data consumers. The messaging framework may maintain subscription and filtering information received from the DCCF and may replicate (or transmit) event notifications/data streams for each subscriber to the same data. Certain embodiments may have more than one messaging framework. For example, control plane signaling used by a NWDAF to collect data from NFs may traverse a different framework from OA&M streaming data.

The messaging framework may include one or more adaptors that translate between, for example, 3GPP defined protocols (e.g., Nnwdaf subscribe/notify protocol) and a data forwarding protocol not specified by 3GPP. The adaptor on the data producer side may also allow any data source data (e.g., from OA&M or legacy sources) to be distributed via the framework without impact on the data source. An adaptor may be associated with specific NF types and/or instances, may manage one or more data sources, and, if separate from the messaging framework, may be discoverable by registering the data sources (e.g., NFs) it supports with the DCCF. If the messaging framework directly supports 3GPP interfaces, adaptors may not be needed. Certain embodiments may alternatively combine an adaptor with the consumer entity or data source.

As described above, FIG. 1 is provided as an example Other examples are possible, according to some embodiments.

Figure 2:
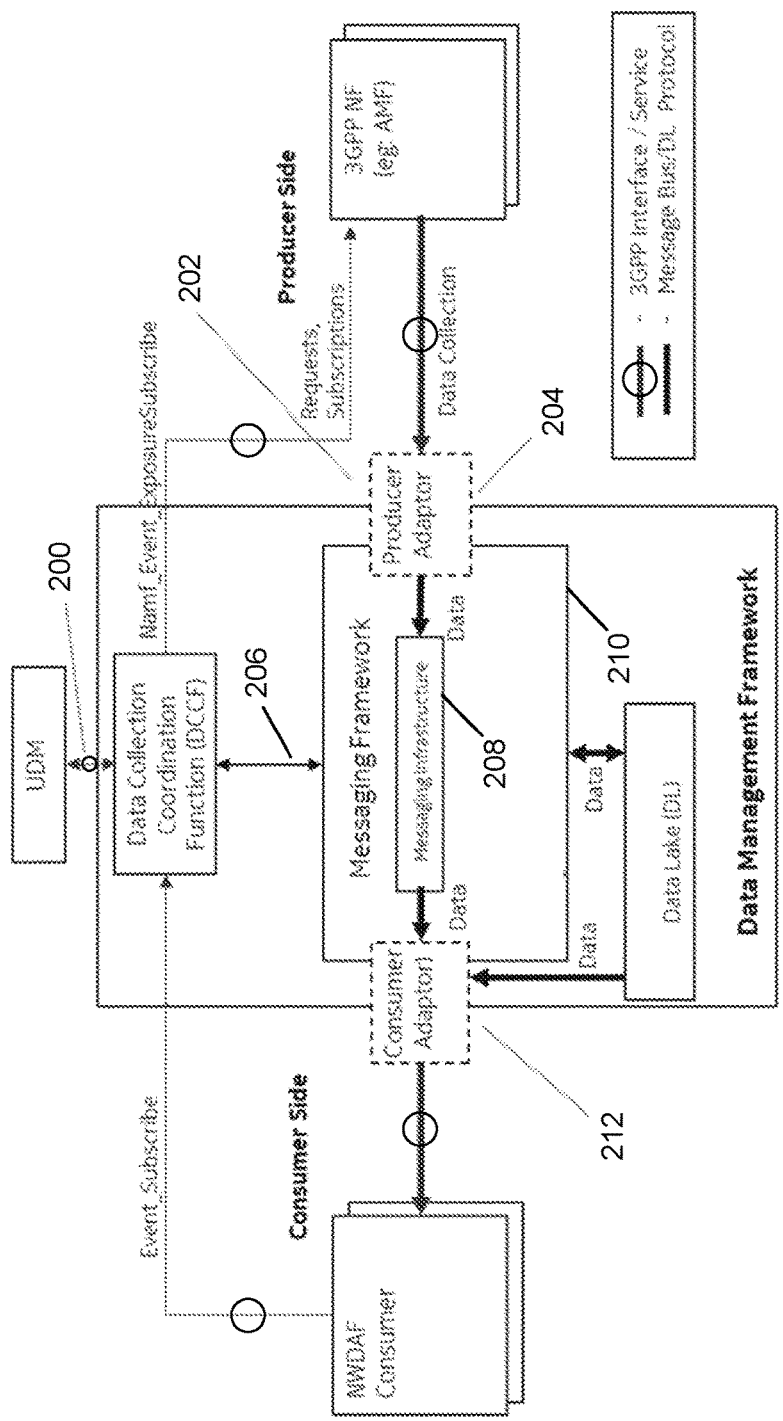
FIG. 2 illustrates an example of a data management framework with a NWDAF consumer entity and a NF data source, according to some embodiments.

FIG. 2 illustrates an example of a data management framework with a NWDAF consumer entity and a NF data source, according to some embodiments. FIG. 2 illustrates one or more network entities similar to that illustrated in FIG. 1. Specifically, FIG. 2 illustrates an architecture where the consumer is a NWDAF, and the data source is a NF, such as an AMF. The DCCF may provide and use, for example, 3GPP-defined services.

As indicated above, FIG. 2 is provided as an example. Other examples are possible, according to some embodiments.

Figure 3:
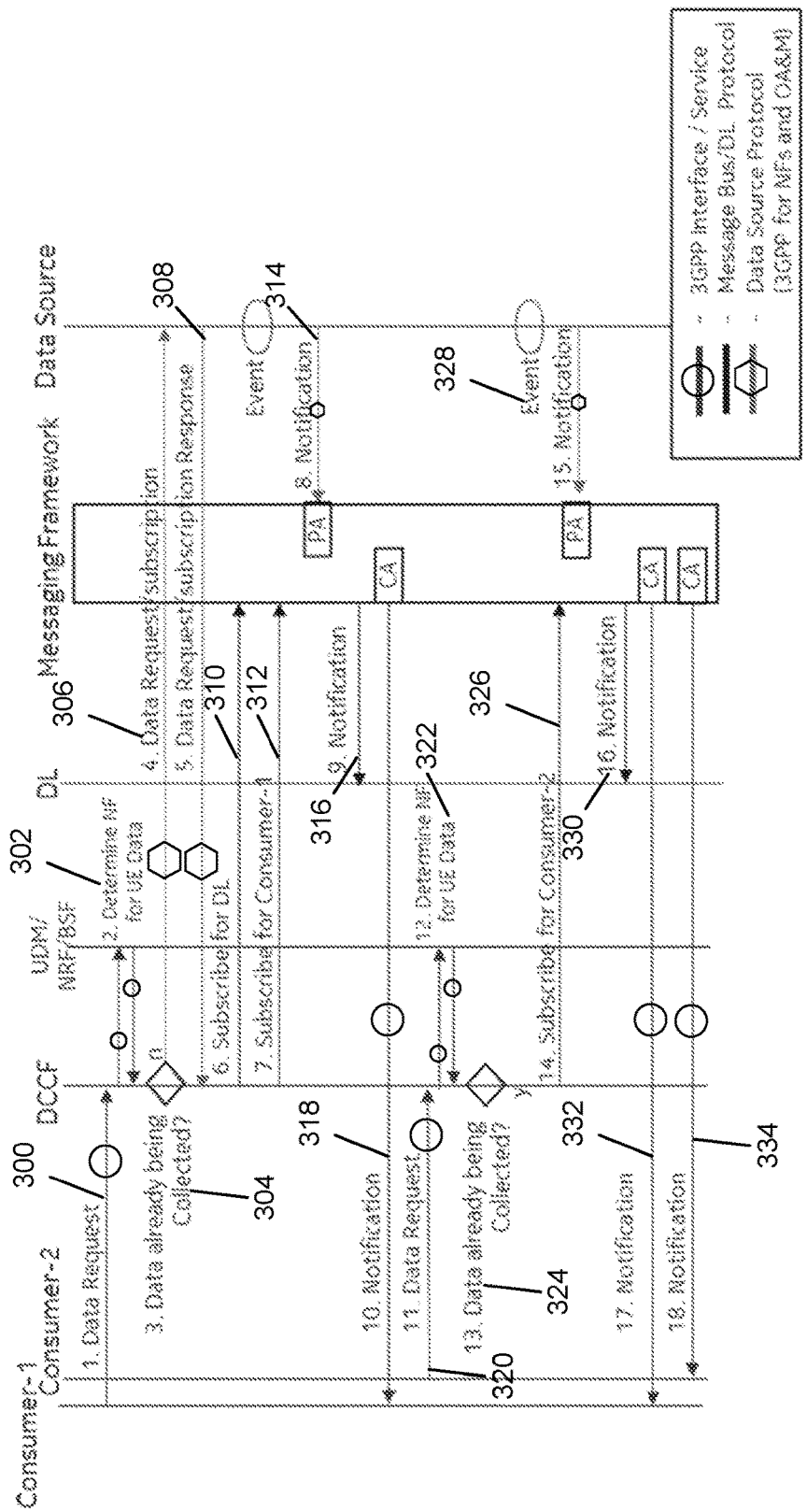
FIG. 3 illustrates an example signal diagram of data collection and distribution with a data management framework, according to some embodiments.

FIG. 3 illustrates an example signal diagram of data collection and distribution with a data management framework, according to some embodiments. For example, FIG. 3 illustrates various consumer entities (consumer-1 and consumer-2), a DCCF, an NF (UDM/NRF/BSF), a data repository (e.g., a data lake (DL)), a messaging framework, and a data source in communication.

As illustrated at 300, consumer-1 (e.g., a NWDAF-1) may send a request for data to the DCCF. The DCCF may determine if the request is for UE data. As illustrated at 302, if the request is for UE data, the DCCF may query the UDM/NRF/BSF to determine the NF serving the UE. As illustrated at 304, the DCCF may determine whether the requested data is already being collected from a data source (e.g., an AMF-1) (e.g., in association with ensuring that the data source is providing the data). As illustrated at 306, the DCCF may send a data subscription/request to the data source (e.g., a NF, such as an AMF-1). As illustrated at 308, the data source may acknowledge the request/subscription.

As illustrated at 310, if notifications are to be archived in the data lake, the DCCF may send a subscription request to the messaging framework requesting notification replication for (or transmission to) the data lake. As illustrated at 312, the DCCF may send a subscription request to the messaging framework requesting notification replication for the consumer-1. As illustrated at 314, a notification may be sent to the messaging framework after an event trigger at the data source. As illustrated at 316, the messaging framework may replicate the notification and may send it to the data lake. As illustrated at 318, the messaging framework may replicate the notification and sends it to consumer-1.

As illustrated at 320, consumer-2 (e.g., NWDAF-2) may subsequently send a request for the same data as consumer-1. The DCCF may determine if the request is for UE data. As illustrated at 322, if the request is for UE data, the DCCF may query the UDM/NRF/BSF to determine the NF serving the UE. As illustrated at 324, the DCCF may determine that the requested data is already being collected from the source (e.g., the AMF-1). As illustrated at 326, the DCCF may send a subscription request to the messaging framework requesting notification replication for consumer-2. As illustrated at 328, a notification may be sent to the messaging framework after an event trigger at the data source. As illustrated at 330, the messaging framework may replicate the notification and may send it to the data lake. As illustrated at 332, the messaging framework may replicate the notification and may send it to consumer-1. As illustrated at 334, the messaging framework may replicate the notification and may send it to the consumer-2.

One advantage of certain embodiments is providing a data management framework that helps to ensure sources/producers of data collect and send/stream data that are used by a consumer, eliminating unneeded measurement, processing, signalling, and/or data distribution. Certain embodiments may also help to ensure that if data are needed by multiple consumers, it is collected once. This improves network scalability and helps ensure that network resources are not diverted from other processing tasks to produce data that is of no or little use. It also helps to isolate consumers from data sources, so data source life-cycle events do not impact the consumer. For example, if an NF data source that serves a UE changes because of a life-cycle event, the NRF may notify the DCCF and the DCCF may update its (UE, NF) association, without impact on the consumer. Certain embodiments may also provide a uniform architecture that can be applied across functional domains (RAN and 5GC), and in both the 5G control and management planes. In addition, certain embodiments may be backwards/forwards-compatible with prior/new network architectures where consumer entities request data from producers (e.g., using subscribe/notify mechanisms).

As described above, FIG. 3 is provided as an example. Other examples are possible, according to some embodiments.

Figure 4:
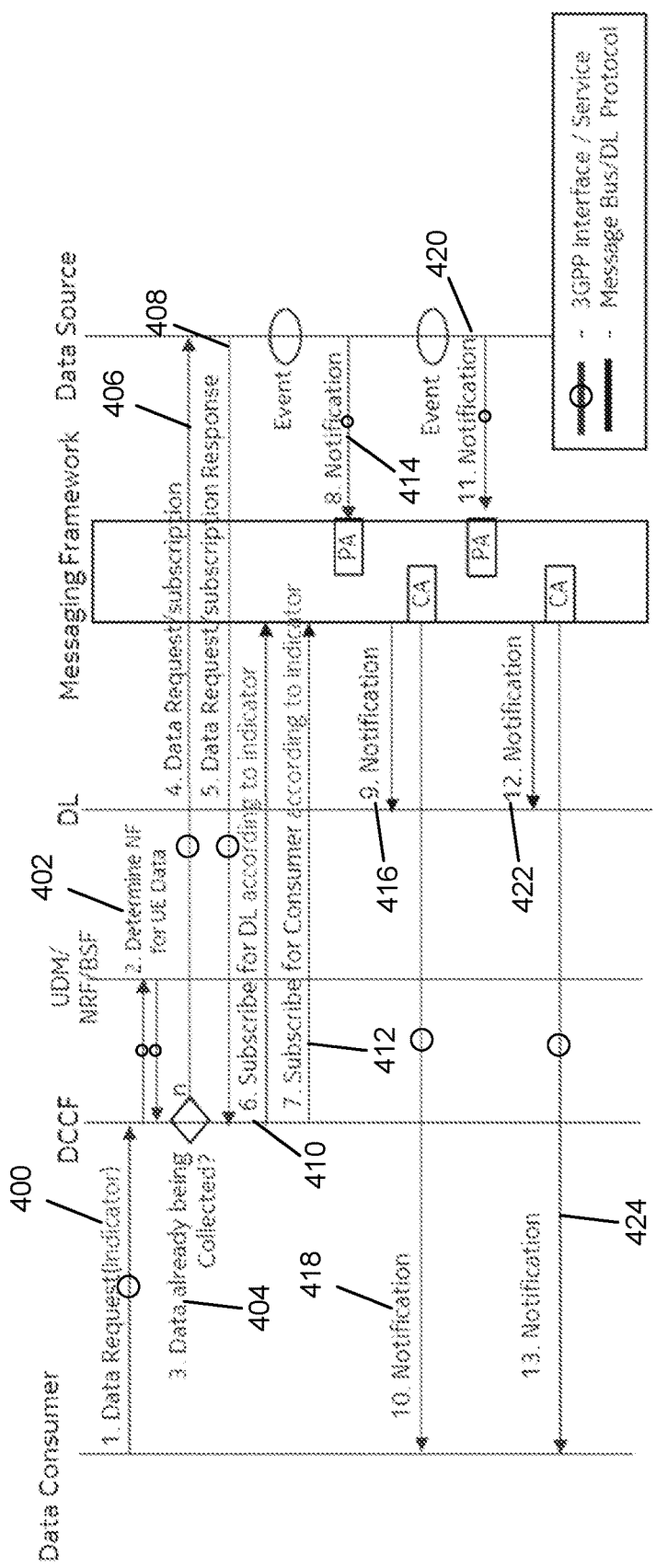
FIG. 4 illustrates an example signal diagram of consumer entity control over data repository collection, according to some embodiments.

FIG. 4 illustrates an example signal diagram of consumer entity control over data repository collection, according to some embodiments. FIG. 4 illustrates a data consumer, a DCCF, a NF (e.g., UDM/NRF/BSF), a data repository (e.g., a DL), a messaging framework, and/or a data source in communication. Certain embodiments illustrated in the example of FIG. 4 may allow the consumer (e.g., NWDAF) or other NF with knowledge of how useful requested data may be in the future (e.g., for AI/ML training) to request persistent storage in a data lake. The example signal diagram illustrated in FIG. 4 illustrates certain embodiments in the context of the previously described data management framework(s) with respect to FIGS. 1-3. The data consumer may be an NWDAF, and the data Source may be an NF service, the RAN, or OA&M providing data via event notification. Additionally, or alternatively, other types of data (e.g., streaming or data files) may be provided by the data source.

As illustrated at 400, the data consumer (e.g., NWDAF) may send a request for data to the DCCF. The message may indicate whether the requested data is to be sent to the consumer entity, to the data lake, or to the consumer entity and the data lake. The DCCF may be configured to use queries to the NRF/BSF/UDM to determine whether to record specified data in a data lake. In some embodiments, the indication may be simplified to a binary indication of whether data is to be provided to the data lake.

The DCCF may determine whether the request is for UE data. As illustrated at 402, if the request is for UE data, the DCCF may query the UDM/NRF/BSF to determine the NF serving the UE. As illustrated at 404, the DCCF may determine whether the requested data is already being collected from a data source (e.g., an AMF), in association with ensuring that the data source is providing the data. As illustrated at 406, the DCCF may send a data/subscription request to the data source (e.g., an AMF). As illustrated at 408, the data source may acknowledge the request.

As illustrated at 410, if the request indicates notifications are to be archived in the data lake, the DCCF may send a subscription request to the messaging framework requesting notification replication for (or notification transmission to) the data lake. As illustrated at 412, if the request indicates notifications are to be sent to the consumer, the DCCF may send a subscription request to the messaging framework requesting notification replication for the data consumer. As illustrated at 414, a notification may be sent to the messaging framework after an event trigger at the data source. A producer adaptor (PA) may translate the data source protocol to a message framework protocol.

As illustrated at 416, if a subscription request was sent in operation 410, the messaging framework may replicate the notification and may send it to the data lake. As illustrated at 418, the messaging framework may replicate the notification and may send it to the consumer if a subscription request was sent in operation 412. A consumer adaptor (CA) may translate the message framework protocol to a data consumer protocol. As illustrated at 420, a notification may be sent to the messaging framework after an event trigger at the data source. As illustrated at 422 and 424 operations 416 and 418 may be repeated, respectively.

One advantage of certain embodiments is that a simple mechanism may be provided to control the storage of data in a data lake based on the future need for that data, as determined by a consumer that makes a data request. Certain embodiments may avoid cluttering a data lake with data, such as with an overflow of data that is of no interest to consumer entities.

As described above, FIG. 4 is provided as an example. Other examples are possible, according to some embodiments.

Figure 5:
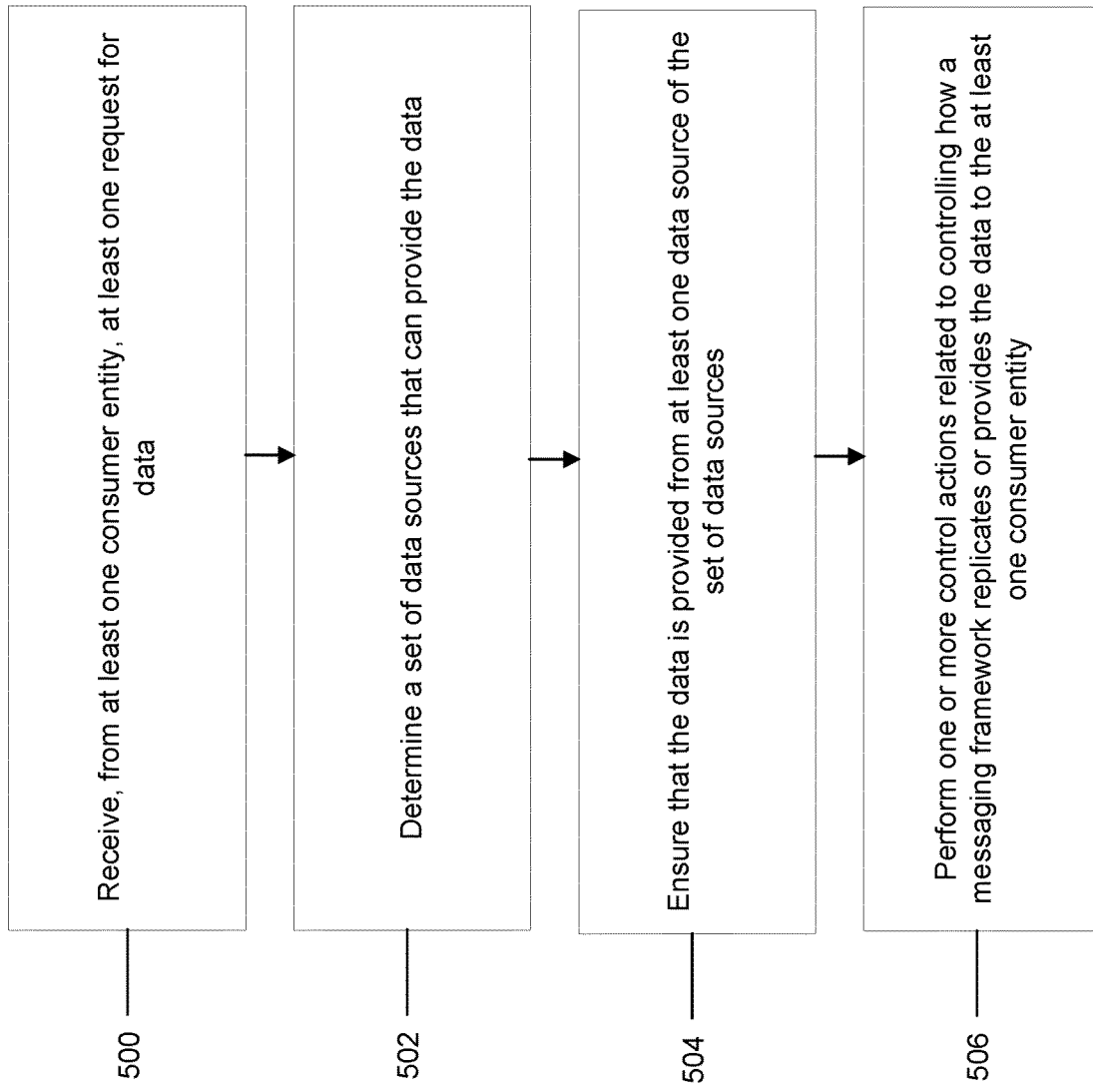
FIG. 5 illustrates an example flow diagram of a method, according to some embodiments.

FIG. 5 illustrates an example flow diagram of a method, according to some embodiments. For example, FIG. 5 shows example operations of network entity (e.g., hosted on apparatus 10 discussed below). Specifically, FIG. 5 illustrates operations of a DCCF. Some of the operations illustrated in FIG. 5 may be similar to some operations shown in, and described with respect to, FIGS. 1-3.

In an embodiment, the method may include, at 500, receiving, from at least one consumer entity, at least one request for data. The method may include, at 502, determining a set of data sources that can provide the data. The method may include, at 504, ensuring that the data is provided from at least one data source of the set of data sources. The method may include, at 506, performing one or more control actions related to controlling how a messaging framework replicates or provides the data to the at least one consumer entity.

In some embodiments, the network entity may comprise a DCCF. In some embodiments, the at least one consumer entity may comprise at least one NWDAF. In some embodiments, determining the set of data sources that can provide the data may further comprise querying at least one other network entity to determine at least one network function serving at least one UE based on the at least one request for the data comprising at least one request for UE-related data.

In some embodiments, ensuring that the data is provided from the at least one data source may further comprise determining whether the data is already being provided from the at least one data source. In some embodiments, determining whether the data is already being provided from the at least one data source may further comprise processing information in at least one database to determine if the data is already being provided from the at least one data source. In some embodiments, ensuring that the data is provided from the at least one data source may further comprise requesting that the data source start providing the data based on determining that the data is not already being collected from the data source. In some embodiments, the method may further comprise sending at least one data request or at least one subscription request to the at least one data source.

In some embodiments, the method may further comprise receiving at least one acknowledgement of the at least one data request or the at least one subscription request based on sending the at least one data request or the at least one subscription request. In some embodiments, the one or more control actions may comprise sending at least one subscription request to the messaging framework requesting sending of at least one notification to at least one data repository or to the at least one consumer entity. In some embodiments, the at least one notification may be associated with the at least one request for the data. In some embodiments, the method may further comprise receiving, from at least one other consumer entity, at least one other request for the data.

In some embodiments, the method may further comprise querying at least one other network entity to determine at least one network function serving at least one UE based on the at least one other request for the data comprising at least one request for UE-related data. In some embodiments, the method may further comprise determining that the data is already being collected from the at least one data source for the at least one consumer entity. In some embodiments, the one or more control actions may comprise sending at least one subscription request to the messaging framework requesting the at least one notification be sent to the at least one other consumer entity.

In some embodiments, the method may further comprise requesting that the at least one data source modify the data being provided based on determining that the data is already being provided from the at least one data source. In some embodiments, the modification to the data may comprise a modification to a granularity of the data. In some embodiments, the method may further comprise updating at least one database with information identifying one or more of the set of data sources providing the data, updating the data being provided, or updating a set of consumer entities receiving the data.

As described above, FIG. 5 is provided as an example. Other examples are possible according to some embodiments.

Figure 6:
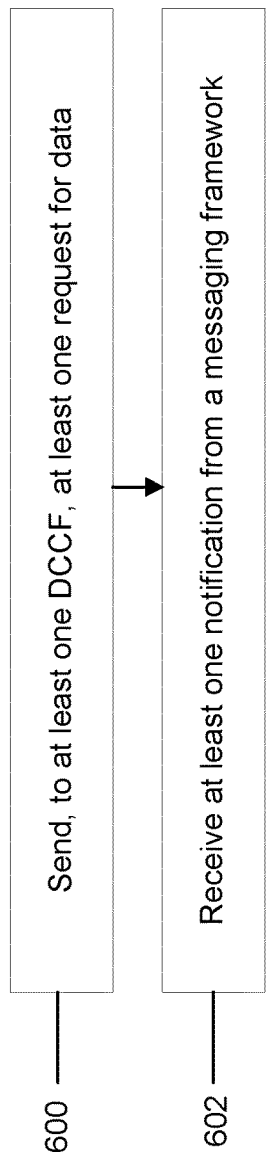
FIG. 6 illustrates an example flow diagram of a method, according to some embodiments.

FIG. 6 illustrates an example flow diagram of a method, according to some embodiments. For example, FIG. 6 shows example operations of network entity (e.g., hosted on apparatus 10 discussed below). Specifically, FIG. 6 illustrates operations of a consumer entity. Some of the operations illustrated in FIG. 6 may be similar to some operations shown in, and described with respect to, FIGS. 1-3.

In an embodiment, the method may include, at 600, sending, to at least one DCCF, at least one request for data. The method may include, at 602, receiving at least one notification from a messaging framework. The at least one notification may be associated with the at least one request for the data.

In some embodiments, the network entity may comprise a NWDAF. In some embodiments, the at least one request for the data may comprise at least one request for UE-related data.

As described above, FIG. 6 is provided as an example. Other examples are possible according to some embodiments.

Figure 7:
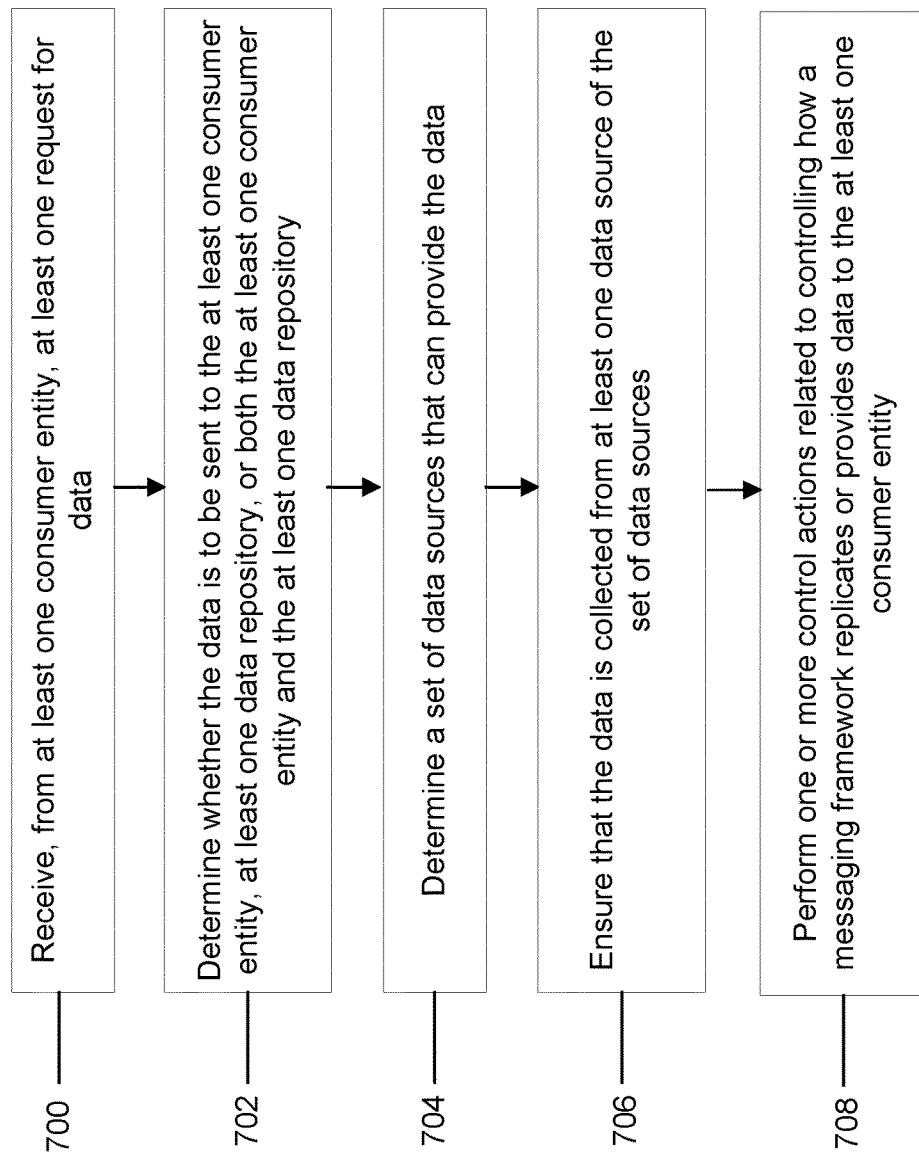
FIG. 7 illustrates an example flow diagram of a method, according to some embodiments.

FIG. 7 illustrates an example flow diagram of a method, according to some embodiments. For example, FIG. 7 shows example operations of network entity (e.g., hosted on apparatus 10 discussed below). Specifically, FIG. 7 illustrates operations of a DCCF. Some of the operations illustrated in FIG. 7 may be similar to some operations shown in, and described with respect to, FIGS. 1-2 and 4.

In an embodiment, the method may include, at 700, receiving, from at least one consumer entity, at least one request for data. The method may include, at 702, determining whether the data is to be sent to the at least one consumer entity, at least one data repository, or both the at least one consumer entity and the at least one data repository. The method may include at 704, determining a set of data sources that can provide the data. The method may include, at 706, ensuring that the data is collected from at least one data source of the set of data sources. The method may include, at 708, performing one or more control actions related to controlling how a messaging framework replicates or provides data to the at least one consumer entity.

In some embodiments, the network entity may comprise a DCCF. In some embodiments, the at least one consumer entity may comprise at least one NWDAF. In some embodiments, the at least one request for the data may comprise at least one indication related to whether the data is to be sent to the at least one network entity, the at least one data repository, or both the at least one network entity and the at least one data repository. In some embodiments, determining whether the data is to be sent to the at least one consumer entity, the at least one data repository, or both the at least one consumer entity and the at least one data repository may further comprise determining whether the data is to be sent to the at least one consumer entity, the at least one data repository, or both the at least one consumer entity and the at least one data repository based on the at least one indication.

In some embodiments, determining whether the data is to be sent to the at least one consumer entity, the at least one data repository, or both the at least one consumer entity and the at least one data repository may further comprise determining whether the data is to be sent to the at least one consumer entity, the at least one data repository, or both the at least one consumer entity and the at least one data repository based on querying at least one other network entity. In some embodiments, determining the set of data sources that can provide the data may further comprise querying at least one other network entity to determine at least one network function serving at least one UE based on the at least one request for the data comprising at least one request for UE-related data.

In some embodiments, ensuring that the data is collected from the at least one data source may further comprise determining whether the data is already being collected from the at least one data source. In some embodiments, determining whether the data is already being collected from the at least one data source may further comprise processing information in at least one database to determine if the data is already being provided from the at least one data source. In some embodiments, ensuring that the data is collected from the at least one data source may further comprise requesting that the at least one data source start providing the data based on determining that the data is not already being provided from the at least one data source.

In some embodiments, the method may further comprise sending at least one data request or at least one subscription request to the at least one data source. In some embodiments, the method may further comprise receiving at least one acknowledgement of the at least one data request or the at least one subscription request based on sending the at least one data request or the at least one subscription request. In some embodiments, the one or more control actions may comprise sending at least one subscription request to a messaging framework requesting sending of at least one notification to the at least one consumer entity, the at least one data repository, or both the at least one consumer entity and the at least one data repository. In some embodiments, the at least one notification may be associated with the at least one request for the data.

In some embodiments, the method may further comprise requesting that the at least one data source modify the data being supplied based on determining that the data is already being collected from the at least one data source. In some embodiments, the modification to the data may comprise a modification to a granularity of the data. In some embodiments, the method may further comprise updating at least one database with information identifying one or more of the data sources providing the data, the data being provided, or a set of consumers receiving the data. In some embodiments, the one or more control actions may comprise sending a subscription request to a messaging framework requesting sending of at least one notification to the first consumer entity, the data lake, or both the first consumer entity and the data repository. In some embodiments, the at least one notification may be associated with the request for the data.

As described above, FIG. 7 is provided as an example. Other examples are possible according to some embodiments.

Figure 8:
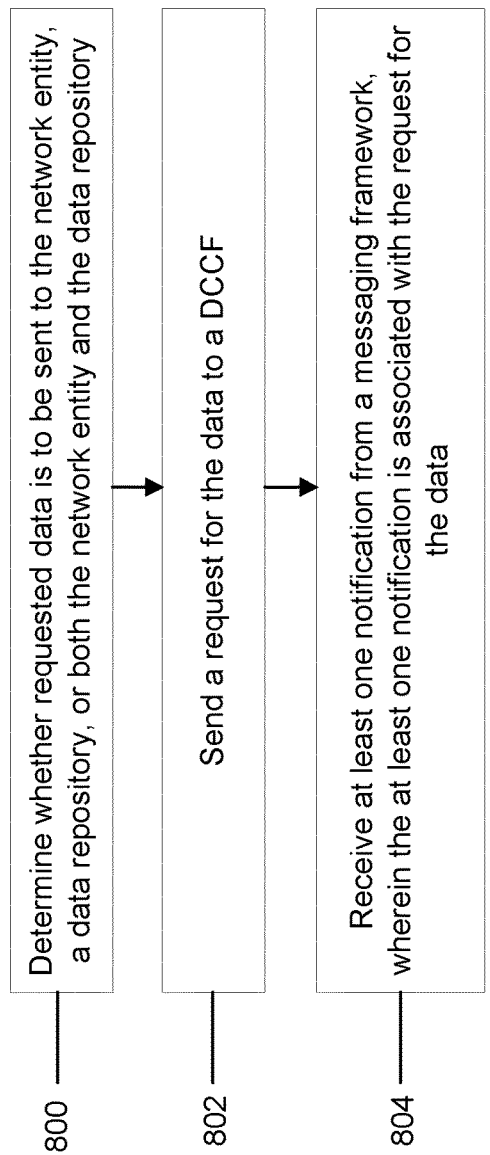
FIG. 8 illustrates an example flow diagram of a method, according to some embodiments.

FIG. 8 illustrates an example flow diagram of a method, according to some embodiments. For example, FIG. 8 shows example operations of network entity (e.g., hosted on apparatus 10 discussed below). Specifically, FIG. 8 illustrates operations of a consumer entity. Some of the operations illustrated in FIG. 8 may be similar to some operations shown in, and described with respect to, FIGS. 1-2 and 4.

In an embodiment, the method may include, at 800, determining whether requested data is to be sent to the network entity, a data repository, or both the network entity and the data repository. The method may include, at 802, sending a request for the data to a DCCF. The request may comprise an indication related to whether the data is to be sent to the network entity, the data repository, or both the network entity and the data repository. The method may include, at 804, receiving at least one notification from a messaging framework, wherein the at least one notification may be associated with the request for the data.

In some embodiments, the network entity may comprise a NWDAF. In some embodiments, the request for the data may comprise a request for UE-related data. In some embodiments, receiving the at least one notification may further comprise receiving the at least one notification from a consumer adaptor. In some embodiments, receiving the at least one notification may further comprise receiving the at least one notification from the consumer adaptor via a data consumer protocol.

As described above, FIG. 8 is provided as an example. Other examples are possible according to some embodiments.

Figure 9B:
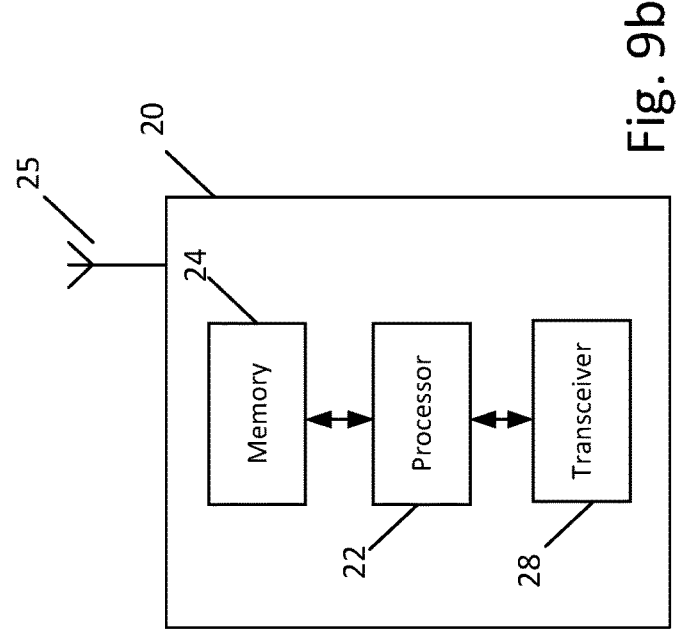
FIG. 9b illustrates an example block diagram of an apparatus, according to another embodiment.
Figure 9A:
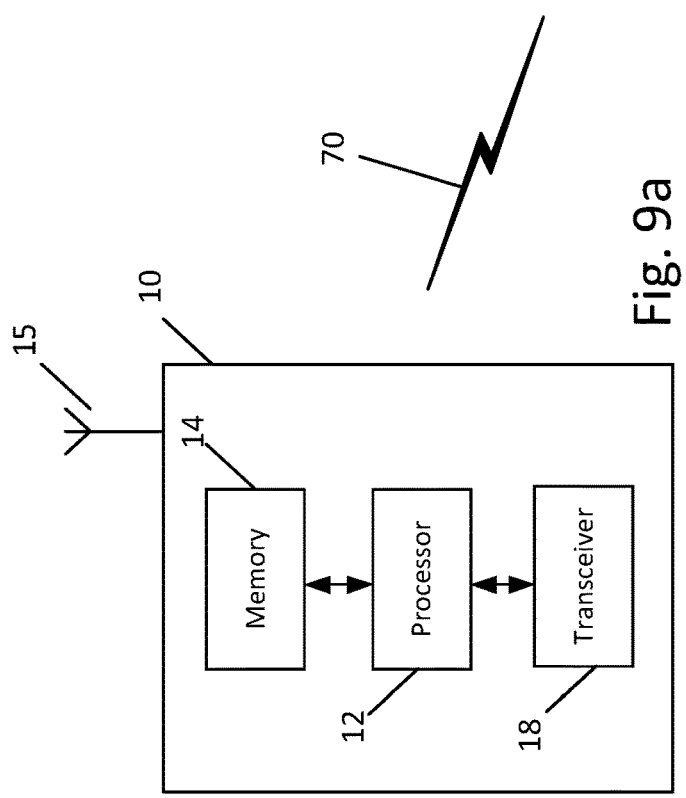
FIG. 9a illustrates an example block diagram of an apparatus, according to an embodiment.

FIG. 9a illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), and/or a WLAN access point, associated with a radio access network, such as a LTE network, 5G or NR. In example embodiments, apparatus 10 may be an eNB in LTE or gNB in 5G. In some embodiments, apparatus 10 may host one or more of the network entities described elsewhere herein, such as a DCCF, a NF, a NRF, a DL, a data source, a consumer entity, a messaging framework, and/or the like.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 9a.

As illustrated in the example of FIG. 9a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 9a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna (s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), Multe-Fire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations of flow or signaling diagrams illustrated in FIGS. 1-8.

For instance, in one embodiment, apparatus 10 may be controlled by memory 14 and processor 12 to receive, from at least one consumer entity, at least one request for data. In one embodiment, apparatus 10 may be controlled by memory 14 and processor 12 to determine a set of data sources that can provide the data. In one embodiment, apparatus 10 may be controlled by memory 14 and processor 12 to ensure that the data is provided from at least one data source of the set of data sources. In one embodiment, apparatus 10 may be controlled by memory 14 and processor 12 to perform one or more control actions related to controlling how a messaging framework replicates or provides the data to the at least one consumer entity.

In one embodiment, apparatus 10 may be controlled by memory 14 and processor 12 to send, to at least one DCCF, at least one request for data. In one embodiment, apparatus 10 may be controlled by memory 14 and processor 12 to receive at least one notification from a messaging framework. The at least one notification is associated with the at least one request for the data.

In one embodiment, apparatus 10 may be controlled by memory 14 and processor 12 to receive, from at least one consumer entity, at least one request for data. In one embodiment, apparatus 10 may be controlled by memory 14 and processor 12 to determine whether the data is to be sent to the at least one consumer entity, at least one data repository, or both the at least one consumer entity and the at least one data repository. In one embodiment, apparatus 10 may be controlled by memory 14 and processor 12 to determine a set of data sources that can provide the data. In one embodiment, apparatus 10 may be controlled by memory 14 and processor 12 to ensure that the data is collected from at least one data source of the set of data sources. In one embodiment, apparatus 10 may be controlled by memory 14 and processor 12 to perform one or more control actions related to controlling how a messaging framework replicates or provides data to the at least one consumer entity.

In one embodiment, apparatus 10 may be controlled by memory 14 and processor 12 to determine whether requested data is to be sent to the network entity, a data repository, or both the network entity and the data repository. In one embodiment, apparatus 10 may be controlled by memory 14 and processor 12 to send a request for the data to a DCCF. The request may comprise an indication related to whether the data is to be sent to the network entity, the data repository, or both the network entity and the data repository. In one embodiment, apparatus 10 may be controlled by memory 14 and processor 12 to receive at least one notification from a messaging framework. The at least one notification may be associated with the request for the data.

FIG. 9b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 9b.

As illustrated in the example of FIG. 9b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 9b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein.

Therefore, certain example embodiments provide several technological improvements, enhancements, and/or advantages over existing technological processes. For example, one benefit of some example embodiments is a reduction or elimination of storage/provisioning of un-needed data. Accordingly, the use of some example embodiments results in improved functioning of communications networks and their nodes and, therefore constitute an improvement at least to the technological field of data subscriptions for a consumer, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single network entity equally applies to embodiments that include multiple instances of the network entity, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments.

According to a first embodiment, a method may include receiving, from at least one consumer entity, at least one request for data. The method may include determining a set of data sources that can provide the data. The method may include ensuring that the data is provided from at least one data source of the set of data sources. The method may include performing one or more control actions related to controlling how a messaging framework replicates or provides the data to the at least one consumer entity.

In a variant, the network entity may comprise a DCCF. In a variant, the at least one consumer entity may comprise at least one NWDAF. In a variant, determining the set of data sources that can provide the data may further comprise querying at least one other network entity to determine at least one network function serving at least one UE based on the at least one request for the data comprising at least one request for UE-related data.

In a variant, ensuring that the data is provided from the at least one data source may further comprise determining whether the data is already being provided from the at least one data source. In a variant, determining whether the data is already being provided from the at least one data source may further comprise processing information in at least one database to determine if the data is already being provided from the at least one data source. In a variant, ensuring that the data is provided from the at least one data source may further comprise requesting that the data source start providing the data based on determining that the data is not already being collected from the data source. In a variant, the method may further comprise sending at least one data request or at least one subscription request to the at least one data source.

In a variant, the method may further comprise receiving at least one acknowledgement of the at least one data request or the at least one subscription request based on sending the at least one data request or the at least one subscription request. In a variant, the one or more control actions may comprise sending at least one subscription request to the messaging framework requesting sending of at least one notification to at least one data repository or to the at least one consumer entity. In a variant, the at least one notification may be associated with the at least one request for the data. In a variant, the method may further comprise receiving, from at least one other consumer entity, at least one other request for the data.

In a variant, the method may further comprise querying at least one other network entity to determine at least one network function serving at least one UE based on the at least one other request for the data comprising at least one request for UE-related data. In a variant, the method may further comprise determining that the data is already being collected from the at least one data source for the at least one consumer entity. In a variant, the one or more control actions may comprise sending at least one subscription request to the messaging framework requesting the at least one notification be sent to the at least one other consumer entity.

In a variant, the method may further comprise requesting that the at least one data source modify the data being provided based on determining that the data is already being provided from the at least one data source. In a variant, the modification to the data may comprise a modification to a granularity of the data. In a variant, the method may further comprise updating at least one database with information identifying one or more of the set of data sources providing the data, updating the data being provided, or updating a set of consumer entities receiving the data.

According to a second embodiment, a method may include sending, to at least one DCCF, at least one request for data. The method may include receiving at least one notification from a messaging framework. The at least one notification may be associated with the at least one request for the data.

In a variant, the network entity may comprise a NWDAF. In some embodiments, the at least one request for the data may comprise at least one request for UE-related data.

According to a third embodiment, a method may include receiving from at least one consumer entity, at least one request for data. The method may include determining whether the data is to be sent to the at least one consumer entity, at least one data repository, or both the at least one consumer entity and the at least one data repository. The method may include determining a set of data sources that can provide the data. The method may include ensuring that the data is collected from at least one data source of the set of data sources. The method may include performing one or more control actions related to controlling how a messaging framework replicates or provides data to the at least one consumer entity.

In a variant, the network entity may comprise a DCCF. In a variant, the at least one consumer entity may comprise at least one NWDAF. In a variant, the at least one request for the data may comprise at least one indication related to whether the data is to be sent to the at least one network entity, the at least one data repository, or both the at least one network entity and the at least one data repository. In a variant, determining whether the data is to be sent to the at least one consumer entity, the at least one data repository, or both the at least one consumer entity and the at least one data repository may further comprise determining whether the data is to be sent to the at least one consumer entity, the at least one data repository, or both the at least one consumer entity and the at least one data repository based on the at least one indication.

In a variant, determining whether the data is to be sent to the at least one consumer entity, the at least one data repository, or both the at least one consumer entity and the at least one data repository may further comprise determining whether the data is to be sent to the at least one consumer entity, the at least one data repository, or both the at least one consumer entity and the at least one data repository based on querying at least one other network entity. In a variant, determining the set of data sources that can provide the data may further comprise querying at least one other network entity to determine at least one network function serving at least one UE based on the at least one request for the data comprising at least one request for UE-related data.

In a variant, ensuring that the data is collected from the at least one data source may further comprise determining whether the data is already being collected from the at least one data source. In a variant, determining whether the data is already being collected from the at least one data source may further comprise processing information in at least one database to determine if the data is already being provided from the at least one data source. In a variant, ensuring that the data is collected from the at least one data source may further comprise requesting that the at least one data source start providing the data based on determining that the data is not already being provided from the at least one data source.

In a variant, the method may further comprise sending at least one data request or at least one subscription request to the at least one data source. In a variant, the method may further comprise receiving at least one acknowledgement of the at least one data request or the at least one subscription request based on sending the at least one data request or the at least one subscription request. In a variant, the one or more control actions may comprise sending at least one subscription request to a messaging framework requesting sending of at least one notification to the at least one consumer entity, the at least one data repository, or both the at least one consumer entity and the at least one data repository. In a variant, the at least one notification may be associated with the at least one request for the data.

In a variant, the method may further comprise requesting that the at least one data source modify the data being supplied based on determining that the data is already being collected from the at least one data source. In a variant, the modification to the data may comprise a modification to a granularity of the data. In a variant, the method may further comprise updating at least one database with information identifying one or more of the data sources providing the data, the data being provided, or a set of consumers receiving the data. In a variant, the one or more control actions may comprise sending a subscription request to a messaging framework requesting sending of at least one notification to the first consumer entity, the data lake, or both the first consumer entity and the data repository. In a variant, the at least one notification may be associated with the request for the data.

According to a fourth embodiment, a method may include determining whether requested data is to be sent to the network entity, a data repository, or both the network entity and the data repository. The method may include sending a request for the data to a DCCF. The request may comprise an indication related to whether the data is to be sent to the network entity, the data repository, or both the network entity and the data repository. The method may include receiving at least one notification from a messaging framework, wherein the at least one notification may be associated with the request for the data.

In a variant, the network entity may comprise a NWDAF. In a variant, the request for the data may comprise a request for UE-related data. In a variant, receiving the at least one notification may further comprise receiving the at least one notification from a consumer adaptor. In a variant, receiving the at least one notification may further comprise receiving the at least one notification from the consumer adaptor via a data consumer protocol.

A fifth embodiment may be directed to an apparatus including at least one processor and at least one memory comprising computer program code. The at least one memory and computer program code may be configured, with the at least one processor, to cause the apparatus at least to perform the method according to the first embodiment, the second embodiment, the third embodiment, or the fourth embodiment, or any of the variants discussed above.

A sixth embodiment may be directed to an apparatus that may include circuitry configured to perform the method according to the first embodiment, the second embodiment, the third embodiment, or the fourth embodiment, or any of the variants discussed above.

A seventh embodiment may be directed to an apparatus that may include means for performing the method according to the first embodiment, the second embodiment, the third embodiment, or the fourth embodiment, or any of the variants discussed above.

An eighth embodiment may be directed to a computer readable medium comprising program instructions stored thereon for performing at least the method according to the first embodiment, the second embodiment, the third embodiment, or the fourth embodiment, or any of the variants discussed above.

A ninth embodiment may be directed to a computer program product encoding instructions for performing at least the method according to the first embodiment, the second embodiment, the third embodiment, or the fourth embodiment, or any of the variants discussed above.

Partial Glossary

AMF Access Management Function
BSF Binding Support Function
CA Consumer Adaptor
DCCF Data Collection and Coordination Function
DL Data Lake
KI Key Issue
MQTT Message Queuing Telemetry Transport
NF Network Function
NWDAF Network Data Analytics Function
NRF Network Resource Function
PA Producer Adaptor
SMF Session Management Function
UDM User Data Management

We claim:

1. An apparatus, comprising:
at least one processor; and
at least one memory storing computer program code, which, when executed by the at least one processor, causes the apparatus at least to perform:
receiving, from at least one consumer entity, at least one request for data, wherein the at least one request comprises at least one request for data related to at least one user equipment (UE);
determining a set of data sources that can provide the data, wherein the determining the set of data sources that can provide the data related to the at least one UE comprises querying, based on the at least one request, at least one other network entity to determine at least one network function serving the at least one UE;
ensuring that the data is provided from at least one data source of the set of data sources, the at least one data source comprising the at least one other network function; and
performing one or more control actions related to controlling how a messaging framework replicates or provides the data to the at least one consumer entity.

2. The apparatus according to claim 1, wherein the apparatus comprises a data collection and coordination function (DCCF), and wherein the at least one consumer entity comprises at least one network data analytics function (NWDAF).

3. The apparatus according to claim 1, wherein the ensuring that the data is collected from the at least one data source comprises:
determining whether the data is already being collected from the at least one data source.

4. The apparatus according to claim 1, wherein the determining whether the data is already being collected from the at least one data source-comprises:
processing information in at least one database to determine if the data is already being provided from the at least one data source.

5. The apparatus according to claim 1, wherein the ensuring that the data is collected from the at least one data source comprises:
requesting that the at least one data source start providing the data based on determining that the data is not already being provided from the at least one data source.

6. The apparatus according to claim 1, wherein the ensuring that the data is collected from the at least one data source comprises:
sending at least one data request or at least one subscription request to the at least one data source.

7. The apparatus according to claim 6, wherein the ensuring that the data is collected from the at least one data source further comprises:
receiving at least one acknowledgement of the at least one data request or at least one subscription request based on the sending the at least one data request or at least one subscription request.

8. An apparatus, comprising:
at least one processor; and
at least one memory storing computer program code, which, when executed by the at least one processor, causes the apparatus at least to perform:
receiving, from at least one consumer entity, at least one request for data;
determining, based on querying at least one other network entity, whether the data is to be sent to the at least one consumer entity, at least one data repository, or both the at least one consumer entity and the at least one data repository;
determining a set of data sources that can provide the data;
ensuring that the data is collected from at least one data source of the set of data sources; and
performing one or more control actions related to controlling how a messaging framework replicates or provides the data to the at least one consumer entity in an instance the data is to be sent to the at least one consumer entity or both the at least one consumer entity and the at least one data repository.

9. The apparatus according to claim 8, wherein the apparatus comprises a data collection and coordination function (DCCF).

10. The apparatus according to claim 8, wherein the at least one consumer entity comprises at least one network data analytics function (NWDAF).

11. The apparatus according to claim 8, wherein the determining the set of data sources that can provide the data comprises:
querying at least one other network entity to determine at least one network function serving at least one user equipment (UE) based on the at least one request for the data, the at least one request for the data comprising at least one request for data related to the at least one UE.

12. The apparatus according to claim 8, wherein the ensuring that the data is collected from the at least one data source comprises:
determining whether the data is already being collected from the at least one data source.

13. The apparatus according to claim 12, wherein the determining whether the data is already being collected from the at least one data source comprises:
processing information in at least one database to determine if the data is already being provided from the at least one data source.

14. The apparatus according to claim 8, wherein the ensuring that the data is collected from the at least one data source, comprises:

requesting that the at least one data source start providing the data based on determining that the data is not already being provided from the at least one data source.

15. The apparatus according to claim 8, wherein the ensuring that the data is collected from the at least one data source comprises:
sending at least one data request or at least one subscription request to the at least one data source.

16. The apparatus according to claim 15, wherein the ensuring that the data is collected from the at least one data source further comprises:
receiving at least one acknowledgement of the at least one data request or at least one subscription request based on the sending the at least one data request or at least one subscription request.

17. The apparatus according to claim 8, wherein the one or more control actions comprises:
sending at least one subscription request to a messaging framework requesting sending of at least one notification to the at least one consumer entity, the at least one data repository, or both the at least one consumer entity and the at least one data repository, wherein the at least one notification is associated with the at least one request for the data.

18. The apparatus according to claim 8, wherein the computer program code, when executed by the at least one processor, further causes the apparatus at least to perform:
requesting that the at least one data source modify the data being supplied based on determining that the data is already being collected from the at least one data source.

19. The apparatus according to claim 18, wherein requesting comprises requesting a modification by the at least one data source to a granularity of the data.

20. The apparatus according to claim 8, wherein the computer program code, when executed by the at least one processor, further causes the apparatus at least to perform:
updating at least one database with information identifying one or more of the at least one data source providing the data, the data being provided, or a set of consumers receiving the data.

21. The apparatus according to claim 8, wherein the one or more control actions comprises:
sending a subscription request to a messaging framework requesting at least one notification be sent to the first consumer entity, a data lake, or both the first consumer entity and the data lake, wherein the at least one notification is associated with the request for the data.

* * * * *